United States Patent [19]

Johnson et al.

[11] Patent Number: 4,892,749

[45] Date of Patent: Jan. 9, 1990

[54] METHOD OF MANUFACTURING A REDUCED CALORIE SAUSAGE CONTAINING COOKED RICE

[75] Inventors: Gerald R. Johnson; Edward C. Jones, Jr.; Milo C. Jones, all of Fort Atkinson, Wis.

[73] Assignee: Jones Dairy Farm, Fort Atkinson, Wis.

[21] Appl. No.: 87,943

[22] Filed: Aug. 10, 1987

Related U.S. Application Data

[62] Division of Ser. No. 755,865, Jul. 17, 1985, Pat. No. 4,735,819.

[51] Int. Cl.$^4$ ............................................. A23L 1/317
[52] U.S. Cl. ..................................... 426/646; 426/105
[58] Field of Search ............... 426/646, 138, 140, 641, 426/618, 657, 804

[56] References Cited

PUBLICATIONS

Gerrard, 1969, Sausage and Small Goods Production, Leonard Hill Books, London, pp. 107–116, 119, 122–125.

Primary Examiner—Carolyn Paden
Attorney, Agent, or Firm—Baker & McKenzie

[57] ABSTRACT

A method of manufacturing sausage is disclosed. This sausage is reduced in calories and is prepared by replacing a portion of the fat in the sausage with cooked rice.

4 Claims, No Drawings

METHOD OF MANUFACTURING A REDUCED CALORIE SAUSAGE CONTAINING COOKED RICE

This application is a division of co-pending application Ser. No. 755,865, filed July 17, 1985, entitled "Reduced Calorie Sausage Containing Cooked Rice," and now U.S. Pat. No. 4,735,819.

This invention relates to a food product in the form of an improved substitute for conventional high fat sausage, and a method of making said product.

DESCRIPTION OF THE PRIOR ART

Historically, sausage has tended to contain the maximum amount of allowable fat permitted by regulation. For example, as recently as 15 or 20 years ago, the bulk of the pork sausage, beef sausage, and breakfast sausage manufactured tended to contain the maximum amount of fat allowable under U.S. Department of Agriculture (USDA) regulations, generally about 50% by weight of the total sausage weight In recent years, however, consumer tastes and dietary interests have been changing and meat products with less fat content have become more popular and increasingly demanded in the marketplace Contributing toward the interest in lower fat meat products has been a growing body of scientific research indicating that excessive human consumption of fat, particularly animal fat, is a significant health hazard.

However, in the case of sausage products, it has been found that a substantial reduction of fat content causes the sausage to become tough, dry, less sweet, less succulent, and distinctly less palatable. For example, pork, beef, or breakfast sausage made from red meat having a fat content below about 35% is considered less palatable due to dryness and chewiness This unpalatability is confirmed by scientifically conducted taste panels and published trade literature In addition to simply increasing the percentage of lean, there have also been efforts to reduce the amount of fat in sausage by including non-meat additives while still attempting to maintain a similar sausage flavor and appearance. One such example is U.S. Pat. No. 3,748,148, issued to Jehle, which discloses the use of admixing granules of Brazil nuts with the meat as a substitute for the fat that has been removed from the meat. According to the patentee, the Brazil nuts are suitable as a substitute for the animal fat in sausage because of their neutral taste, their higher vegetable content, smaller content of carbohydrates and neutral color The Brazil nuts in Jehle cannot, however, be expected to provide the textural qualities of the high fat sausage substitute produced according to the present invention.

Another representative attempt at reducing the amount of fat in sausage is disclosed in U.S. Pat. No. 4,504,515, issued to Hohenester This patent discloses a process for preparing low-fat meat products which precomminute major quantities of lean meat selected from the group consisting of beef, veal, pork and hare, then thoroughly admixing the meat with minor quantities of skimmed milk or whole milk in the presence of less than 5% by weight of seasonings and/or preservatives The milk in Hohenester cannot, however, be expected to provide the textural qualities of the more coarsely ground high fat sausage substitute produced according to the present invention.

In recent years attempts have also been made to fill the market demand for low-fat sausage with various poultry breakfast sausages, such as turkey breakfast sausage. While poultry is generally lower in fat than pork and beef, the poultry sausage currently available on the market is very dry and lacking in juiciness and succulence.

Another attempt in the mid-1970's proposed a sausage made with a high percent of lean meat which resulted in approximately 30% fat content. This product was commercially unsuccessful.

There is also a particular variation of boudin, a blood sausage originating in France, that contains rice. It is produced by first grinding and cooking the meat before it is combined with the rice. The resulting composition is a soft, mushy, pudding-like texture with no resemblance to the high ft sausage substitute of this invention. Further, in boudin the rice is texturally and visually a clearly identifiable component which is in sharp contrast to the food product of this invention in which the rice, at least to the eye and taste of the lay observer, is indistinguishable from the fat.

Another class of sausage products includes the use of non-meat extenders. Originally such extenders were ingredients like bread crumbs and cereal which were simply mixed with higher cost ground meat to lower the cost of the recipe or product. Subsequently, sausage makers developed various milk and cereal derivatives which performed such additional functions as aiding the absorption of fat and the absorption of added moisture to increase finished cooking yield; adding certain protein values to the sausage to improve the emulsion stability and, in certain cases, imparting a different flavor. The underlying reasons for seeking these additional functions remain principally economic; that is, increasing product yields and lowering product costs.

In the past, rice and meat have been used in the preparation of non-sausage foods. Examples of such non-sausage foods that contain meat and rice (in addition to other ingredients) include jambalaya, Spanish rice with meat, poultry dressing, and peppers and cabbage leaves stuffed with a mixture of ground beef, rice and other vegetables. These foods use rice simply as part of a multi-vegetable meat mixture and the food neither resembles nor is identified as a sausage. In addition, unlike the high fat sausage substitute produced according to the present invention, the rice in these products is a clearly identifiable component, both texturally and visually.

SUMMARY OF THE INVENTION

The invention relates to an improved substitute for conventional high fat sausage in which a substantial portion of the animal fat in the high fat sausage is replaced with lean meat and rice. It has been found that the present invention produces a high fat sausage substitute having the widely accepted characteristics of texture, taste and appearance associated with conventional high fat sausage. In addition, the high fat sausage substitute produced according to the preferred method of the present invention has, as contrasted to the USDA pork sausage standard, 60% less fat, 45% less calories, 35% more protein, and a cooking yield 35% higher than conventional high fat sausage.

According to the present invention, when the high fat sausage substitute is a pork, beef or breakfast sausage, the ingredient formulation by weight for the meat portion is lean meat in the amount of between about 40% to 90%, fat in the amount of between about 5% to 35%, rice in the amount of between about 2% to 35%, salt in an amount sufficient to extract the myosin, that is, up to 4% of the weight of the meat-rice mixture, and a bonding agent, which bonding agent may be myosin, or myosin and one or more substances. High fat pork sausage substitute and high fat beef sausage substitute as used herein refers to single species products that in addition to pork or beef may also contain water, sugar, dextrose, salt, spices and curing agents. Additional ingredients may include flavorings, flavor enhancers, antioxidants or typical extenders including cereal, textured vegetable protein (TVP) and dried milk.

High fat breakfast sausage substitute as used herein refers to a product containing the meat from one or more animal species and which may also include the non-meat ingredients listed above for pork and beef sausage substitutes.

In the present invention, the rice, which is an integral part of the product, binds with the meat portion of the formulation to provide the texture, taste and appearance of the substituted fat. It has been found that the rice provides a moist, fat-like character and structure which does not affect the basic meat flavors associated with the traditional higher fat sausage. In this manner, the rice and lean combination replaces a major portion of the fat and imparts an equally pleasing and palatable texture and mouth feel in a low fat product which, without the addition of the rice, would be tougher, drier, chewier, and distinctly less palatable.

While the above ingredients are preferred, the present invention contemplates varying the types of animal species, the fat/lean ratio, the meat/rice ratio, and the addition of other ingredients typically or sometimes used in sausage including, but not limited to, salt, spices, herbs, water, sugar, dextrose, flavorings, flavor enhancers, textured vegetable protein, antioxidants and curing agents. In addition it has been found that the aforementioned and other similar non-meat ingredients can be added to the high fat sausage substitute produced according to the present invention in similar proportions as they are used in conventional sausage without affecting the utility of the present invention. It has been found that the food product of the present invention can be adapted to all the forms, shapes, and processes typically associated with high fat sausage.

DETAILED DESCRIPTION OF THE INVENTION

The method of producing high fat sausage substitute according to the present invention comprises, in general, the following steps.

A mixture of meat, containing both lean and fat, and rice is formed in the presence of a bonding agent in an amount and manner to form a matrix around and among the lean, fat and rice components of the base mixture. Salt is added, if needed, to this base mixture in an amount sufficient to assist the extraction of myosin from the meat. The bonding agent may be myosin, or myosin plus one or more recognized bonding agents such as hydrocolloids, egg albumin, gelatin, flours, starch, or collagen. The quantity of salt added may be anywhere from 0 to 4%. It will be understood that no salt need be added in those instances when there is sufficient salt already present in the base mixture to perform the desired function of assisting the extraction of myosin. Experience has shown that about 3–4% salt is the maximum upper tolerable limit of salt for human palatability.

Both the aforementioned bonding agents and salt may be considered to be additives. Other additives which may be added as desired are flavorings, (such as onions, garlic, celery, parsley, oleo resin spice extracts, and paprika), spices (such as pepper, sage, ginger, thyme, marjoram, fennel), seasoning, water, anti-oxidants (such as butylated hydroxy anisole (BHA), butylated hydroxy toluene (BHT), citric acid, propylgallate), extenders (such as cereals, cereal derivatives, textured vegetable protein, milk derivatives), flavor enhancers (such as MSG, hydrolyzed plant and/or vegetable protein, autolyzed yeast extract), sweeteners (such as natural or artificial sugar, dextrose, synthetic sweeteners such as cyclamates), coloring agents (such as paprika, dyes), smoke, curing agents (such as sodium nitrite alone or in combination with sodium erythorbate, or sodium ascorbate) and vitamins. It will be noted that some substances fall under two or more of the above classes of additives, such as paprika.

Rice may be prepared in a wide variety of ways including hydrating, parboiling or cooking. It is preferred that precooked dried rice be the starting form of rice, with water being added in a proportion of about three parts of water to one part of rice, by weight, to rehydrate the rice prior to addition to the meat.

One of the outstanding features of the product is that the final rice content, regardless of the cooking or hydration method, is indistinguishable from fat globules; that is, only the extremely practiced eye and palate can discern the difference between an individual rice particle and a fat globule in both an uncooked and cooked condition. For all practical purposes, the rice and fat are indistinguishable to the consumer in the specified ranges.

A number of samples of the food product of this invention were prepared generally as follows.

First, water which may vary between approximately 32° F. and boiling is added to rice. The rice is preferably dried, precooked rice, such as Minute Rice sold by General Foods, Riviana Instant Rice sold by Riviana Foods, Inc. or Uncle Ben's Precooked Rice. The ratio of the weight of the water to the weight of the rice when using precooked rice is preferably approximately 3 parts of water to 1 part of rice. The water and rice mixture should preferably remain in a 28° F. cooler for 24 to 48 hours. Although precooked Minute Rice and Riviana Rice have been successfully used in the production of the subject products, it is believed that other forms of cooked and rehydrated rice may also be used.

In the next step, boneless meat, at a temperature of between about 23° F. to 102° F., and having a fat percentage of between 4% to 35% is added to the rehydrated rice. The percent by weight of the meat to the total weight of the high fat sausage substitute may vary between 65% to 98% and the percent by weight of the rehydrated rice to the total of the high fat sausage substitute may vary between 2% to 35%.

In the next step, the boneless meat and rice are coarse ground through a large-hole plate to begin myosin extraction from the meat. This step may also be accomplished by chopping rather than grinding. The rice can be added to the meat either prior to coarse grinding or chopping, or after the meat is coarse ground or chopped.

Next, the meat and rice are blended in a mixer or chopper and the spices, such as salt, sage, black pepper and ginger, are added, although other seasonings and additives could be added as well. The mixing time will vary depending on the equipment that is used, the RPM's, and types of mixing arms or chopper blades, but it is usual for the average time of mixing to be approximately three minutes. During this step, myosin is further extracted from the meat and the myosin envelops the meat and rice components to achieve the unique result of a traditional sausage flavor, texture, and consistency.

In the next step, the mixture is ground through a small-holed plate which has the effect of further extracting and distributing the myosin. A 9/64-inch plate has been used, although other small-holed plates, such as ⅛-inch, 5/32-inch, 3/16-inch, etc., plates may also be used. The effect may also be achieved by chopping or a combination of chopping and grinding. If chopping is used, chopping time is dependent on the chopper speed and number and pattern of the blades. Care should be taken during this step to make certain that the rice particles maintain their structural integrity and that they maintain a size generally similar to the meat particles. The average finished composition particle should be preferably from ⅛ to ¼-inch in particle size. The resulting composition should preferably have a finished temperature of between 36° F. to 42° F., although the temperature range for the product if prerigor meat is used may range between 23° F. to 102° F.

The composition is thereafter compacted and processed as conventional sausage, either precooked or uncooked. The cooked or uncooked sausage may take any conventional form, including tubes or rolls and links in casings. Alternatively, the product may be cooked or formed raw (with the casings peeled after the product is formed or cooked), or it may be extruded into skinless links or patties, or it may be processed as patties sliced or cleaved from a product that had been stuffed in a casing, or it may be formed into bulk sausage.

While the above methods and procedures are preferred, the equipment can be varied by using a variety of grinding plate sizes and/or grinding and/or chopping cycles and sequences consistent with the manufacture of conventionally manufactured sausage.

The high fat sausage substitute may then be cooked by the consumer by any of the conventional cooking methods.

Several examples of varying ingredients and methods of formulation of compositions within the scope of the invention are as follows. All percentages are based on the total weight of only the meat and rice components of the mixture, except Example 7 which included the addition of free water. Further, hydrated cooked rice, which had been reformulated on the basis of three parts of water to one part of rice, by weight, was used unless otherwise noted as in Example 7.

EXAMPLE 1

The following ingredient formulation by weight percentages was prepared. In this example the finished product will have a finished fat level of approximately 20%.

| | |
|---|---|
| 70.0% | lean pork |
| 19.8% | pork fat |
| 10.25% | hydrated cooked rice |
| 100.0% | |

Meat having an internal temperature of 34° F. was placed on a conveyorized scale and the cooked rice having an internal temperature of 40° F. was added to the conveyorized scale with the meat. The hydrated cooked rice was prepared in the following manner: Minute Rice and water were weighed (25% rice, 75% water) and the water and rice were mixed and the mixture was stored in a 28° F. cooler for 24 hours. Both the meat and rice were then ground using a four-hole teardrop plate to reduce the particle size of the meat to approximately two-inch pieces to begin the myosin extraction. The product was then conveyed to a mixer/grinder where the seasonings consisting of salt, sage, black pepper and ginger were added. The product was then mixed for three minutes causing further extraction of the myosin from the meat and a blending of the meat with the rice. The resulting composition was then ground through a 9/64-inch plate and the resulting temperature of the composition was 40° F.

Portions of the composition were stuffed and linked in both natural and collagen casings, using a stuffer and linker. Another portion of the composition was stuffed into cellulose casings, using a stuffer and an automatic linker, and then cooked using a smokehouse. The cellulose casings were then peeled from the fully cooked links, some of which were also prebrowned. Additional portions of the composition were stuffed into plastic film tubing and fibrous casing and then formed as consumer sized tube packages (rolls) and also as longer sticks. Some of these tube packages were fully cooked. Some of the longer sticks were sliced as uncooked patties, and some sticks were cooked and then sliced as precooked patties, some of which were prebrowned. The equipment used for this was a forming and packaging machine, cleaver, and cooker. Another portion of the composition was extruded into skinless links, some of which were packed immediately in boxes and some fully cooked in a counter flow oven thereby producing precooked links, some of which were also prebrowned. Additional portions of the composition were stuffed and linked into both natural and collagen casings, using a stuffer and linker, and fully cooked in a counter flow oven producing precooked links, some of which were also prebrowned. Another portion of the composition was extruded into patties, a portion of the patties being cooked in a counterflow oven to produce a fully cooked patty, some of which were also prebrowned.

EXAMPLE 2

| | |
|---|---|
| 66.9% | lean beef |
| 19.7% | beef fat |
| 13.4% | hydrated cooked rice |
| 100.0% | |

The meat having an internal temperature of 34° F. was added to a six-bladed chopper. The chopper at low speed reduced the particle size to approximately 1½ to 2-inch pieces in three bowl turns. The hydrated cooked rice having an internal temperature of 36° F. was added to the meat and the seasonings consisting of salt, sugar, sage, black pepper and ginger were added to the meat. The hydrated cooked rice was formulated in the same manner as in Example 1, except that it was held for a period of 48 hours prior to being formulated into the product. The product was then mixed in the chopper for 30 low speed bowl turns causing a further extraction of myosin from the meat, and a blending of the meat with the cooked rice. Thereafter the product was conveyed to a grinder and the finished product was ground through a 9/64-inch plate. The finished temperature of the product was 39° F.

Portions of the composition may be stuffed and linked in both natural and collagen casings, using a stuffer and linker. Another portion of the composition may be stuffed into cellulose casings, using a stuffer and an automatic linker, and then cooked using a smokehouse. The cellulose casings may then be peeled from the fully cooked links, some of which may also be prebrowned. Additional portions of the composition may be stuffed into plastic film tubing and fibrous casing and then formed as consumer sized tube packages (rolls) and also as longer sticks. Some of these tube packages may be fully cooked. Some of the longer sticks may be sliced as uncooked patties, and some sticks may be cooked and then sliced as precooked patties, some of which may be prebrowned. The equipment used for this may be a forming and packaging machine, cleaver, and cooker. Another portion of the composition may be extruded into skinless links, some of which may be packed immediately in boxes and some may be fully cooked in a counter flow oven thereby producing precooked links, some of which may be also prebrowned. Additional portions of the composition may be stuffed and linked into both natural and collagen casings, using a stuffer and linker, and fully cooked in a counterflow oven to produce precooked links, some of which may also be prebrowned. Another portion of the composition may be extruded into patties, a portion of the patties being cooked in a counterflow oven to produce a fully cooked patty, some of which may also be prebrowned.

EXAMPLE 3

The following ingredient formulation by weight percentage was prepared:

| | |
|---|---|
| 29.7% | lean pork |
| 27.8% | lean beef |
| 7.4% | pork fat |
| 9.3% | beef fat |
| 25.8% | hydrated cooked rice |
| 100.0% | |

The meats having an internal temperature of 37° F. were added to a conveyorized scale with hydrated cooked rice prepared in the same manner as in Example 1 having a temperature of 35° F. (The rice was held in a 28° F. cooler for 72 hours.) The composition was then conveyed through a coarse grinder and the materials were ground through a one-inch plate and the product was conveyed to a mixer/grinder. The product was then mixed for two minutes during which time the myosin was further extracted from the meat. Spices consisting of salt, sugar, dextrose, sage, black pepper and ginger were added. The product was then final ground through a 5/32-inch plate and the temperature of the resulting composition was 41° F. Thereafter the product may be processed in a manner similar to the processing described in Example 2.

EXAMPLE 4

The following ingredient formulation by weight percentage was prepared:

| | |
|---|---|
| 45.0% | boneless turkey |
| 36.0% | lean pork |
| 9.0% | pork fat |
| 10.0% | hydrated cooked rice |
| 100.0% | |

The meats (both the turkey and pork had an internal temperature of 34° F.) were placed on a conveyorized scale and the hydrated cooked rice having an internal temperature of 50° F. was added. The hydrated cooked rice was prepared in the same manner as in Example 1, except that it was held for a period of 25 hours in a 28° F. cooler. Both the meat materials and rice were conveyed to a coarse grinder and thereafter ground through a four-holed teardrop plate to reduce the particle size of the meat to approximately 1½ to 2 inch pieces. The product was then conveyed to a mixer/grinder and the seasonings or additives consisting of salt, MSG, sage, black pepper and ginger were added. The product was then mixed for 2½ minutes causing further extraction of the myosin from the meat and a blending of the meat with the rice. The resulting composition was then final ground through a 3/16-inch plate and the resulting temperature of the product was 50° F. Thereafter the product may be processed as earlier described in a manner similar to the processing described in Example 2.

EXAMPLE 5

The following ingredient formulation by weight percentage was prepared to make Italian Sausage:

| | |
|---|---|
| 71.1% | lean pork |
| 17.9% | pork fat |
| 11.0% | hydrated cooked rice |
| 100.0% | |

The meat having an internal temperature of 34° F. was placed on a conveyorized scale and the cooked rice having an internal temperature of 40° F. was added. The hydrated cooked rice was prepared in the following manner: Riviana rice and water were weighed (25% rice, 75% water) and the water and rice were mixed and the mixture was stored in a 28° F. cooler for 25 hours. Both the meat and rice were then conveyed to a grinder and coarse ground using a four-hole teardrop plate to reduce the particle size of the meat to approximately two-inch pieces. The product was then conveyed to a mixer/grinder and the seasonings consisting of salt, dextrose, black pepper, fennel and red pepper were added. The product was then mixed for three minutes causing further extraction of the myosin from the meat and a blending of the meat with the cooked rice. The resulting composition was then ground through a 3/16-inch plate and the resulting temperature of the composition was 40° F. Thereafter the product may be processed as earlier described in a manner similar to the processing described in Example 2.

EXAMPLE 6

The following ingredient formulation by weight percentage was prepared to make Bratwurst:

| | |
|---|---|
| 70.1% | lean pork |
| 17.5% | pork fat |
| 12.4% | cooked hydrated rice |
| 100.0% | |

The meat having an internal temperature of 34° F. was placed on a conveyorized scale with rice. The hydrated cooked rice was prepared in the following manner: Riviana rice and water were weighed (25% rice, 75% water) and the water and rice were mixed and the mixture was stored in a 28° F. cooler for 24 hours. Both the meat and rice were then conveyed to a grinder and coarse ground using a four-hole teardrop plate to reduce the particle size of the meat to approximately two-inch pieces. The product was then conveyed to a mixer/grinder and the seasonings or additives consisting of salt, dextrose, MSG, sage, black pepper and celery powder were added. The product was then mixed for three minutes causing a further extraction of the myosin from the meat and a blending of the meat with the cooked rice. The resulting composition was then ground through a 5/32-inch plate and the resulting temperature of the composition was 40° F. Thereafter the product may be processed as earlier described in a manner similar to the processing described in Example 2.

EXAMPLE 7

The following ingredient formulation by weight percentage was prepared:

```
70.1%  lean pork
17.5%  pork fat
 3.1%  dehydrated cooked rice
 9.3%  water
100.0%
```

The meat having an internal temperature of 34° F. was placed on a conveyorized scale and rough ground through a four-hole plate. The meat materials were then conveyed to a mixer/grinder and the dehydrated Riviana rice, water at a temperature of 58° F., and seasonings consisting of salt, sage, black pepper and ginger were added to the mixer. The product was then mixed for four minutes causing further extraction of the myosin from the meat and a blending of the meat with the cooked rice. The product was then final ground through a 5/32-inch plate and the resulting finished product had a temperature of 42° F. Thereafter the product may be processed as earlier described in a manner similar to the processing described in Example 2.

EXAMPLE 8

The following ingredient formulation by weight percentage was prepared:

```
70.1%  lean pork
17.5%  pork fat
12.4%  milled rice cooked from a raw state
100.0%
```

The meat having an internal temperature of 37° F. was added to a chopper. The rice was cooked in a steam jacketed kettle with water at a temperature of 190°-200° F., for 15 minutes. After cooking, the rice was rinsed and chilled to a temperature of 5° F. for one hour and then drained. The meat materials were 10 then reduced in a chopper to approximately 1½ to 2-inch particles in three bowl turns. The cooked rice and seasonings consisting of salt, dextrose, sage, black pepper and ginger were added to the product and the product was mixed in the chopper for 25 bowl turns causing further myosin extraction and a blending of the meat with the cooked rice. The resulting mixture was then added to a grinder/mixer and the product was final ground using a 9/64-inch plate. Thereafter the product may be processed as earlier described in a manner similar to the processing described in Example 2.

End products from the foregoing batches were then judged on the basis of texture, flavor, and appearance and all were determined to be acceptable by current commercial standards.

A further series of samples was prepared and subjected to panel testing. Specifically, a modified hedonic rating scale was used. In this method, the standard nine point hedonic rating scale is modified by eliminating the middle category, "neither like nor dislike," leaving eight categories consisting of like extremely, like very much, like moderately, like slightly, dislike slightly, dislike moderately, dislike very much, and dislike extremely. Each category has an assigned numerical value ranging from 8 for like extremely to 1 for dislike extremely.

In the panel testing, each panelist was presented, with respect to the pork base food product, with a control product sample and five sample mixes and asked to rate each of the six samples on the above described modified hedonic scale. The control product had a content of 52% lean pork, 48% pork fat and no rice and is a commercial product which has enjoyed wide acceptance. All samples in all tests had the same seasonings added as existed in the control sample so as to minimize the effect of spices and seasonings. Since no commercially available control product was available for beef, the panelists were confined to ranking the five beef samples against each other.

The compositions of the test samples and the rating thereof are shown in the following table.

| TEST NO. | LEAN | FAT | RICE | RATING |
|---|---|---|---|---|
| PORK | | | | |
| 1. | 72 | 8 | 20 | 5.2 |
| 2. | 90 | 8 | 2 | 6.0 |
| 3. | 63 | 35 | 2 | 4.6 |
| 4. | 73 | 25 | 2 | 6.0 |
| 5. | 71 | 4 | 25 | 4.4 |
| 6. | 50 | 25 | 25 | 4.2 |
| 7. | 60 | 10 | 30 | 2.4 |
| 8. | 55 | 10 | 35 | 3.0 |
| 9. | 50 | 10 | 40 | 2.4 |
| 10. | 40 | 10 | 50 | 1.8 |
| 11. | 70 | 25 | 5 | 5.0 |
| 12. | 85 | 10 | 5 | 5.8 |
| 13. | 80 | 15 | 5 | 6.0 |
| 14. | 70 | 10 | 20 | 5.6 |
| 15. | 65 | 15 | 20 | 5.4 |
| 16. | 55 | 25 | 20 | 4.0 |
| 17. | 70 | 20 | 10 | 6.2 |
| 18. | 70 | 20 | 10 | 6.2 |
| BEEF | | | | |
| 19. | 88 | 10 | 2 | 3.2 |
| 20. | 50 | 25 | 25 | 4.2 |
| 21. | 70 | 10 | 20 | 4.0 |
| 22. | 70 | 25 | 5 | 3.4 |
| 23. | 70 | 20 | 10 | 3.4 |

NOTES:
Tests Nos. 17, 18 and 23 are approximate, with an accuracy believed to be within plus or minus about 1%. Test No. 18 included a milk powder derivative.

From the above it will be noted that compositions which ranged up to 35% rice, and as little as 4% fat had a rating of 3.0 or above with the variance noted below.

A 3.0 rating is considered to be a commercially acceptable rating on the modified hedonic scale used, though of course a higher rating is preferred. Specifically, on the standard hedonic, a rating of 7.0 is very outstanding (and quite unusual), and a rating in the range of 4.0 up to 7.0 is considered to be commercially acceptable. On the modified hedonic scale used in the above described panel testing, these values translate to 6.0, and 3.0 up to 6.0 respectively.

Compositions which fall within the range of 3.0 and above are epitomized by test nos. 1-8 and 11-23. (Test number 7 is considered an aberration since the compositions of test numbers 5, 6 and 20 which had rice contents only 5% lower than the composition of test 7 had a rating of 4.2 or higher, and the composition of test No. 8, which had a rice content 5% higher than that of test number 7, fell into the acceptable range).

Of particular significance is the fact that compositions which had as little as 15% fat or less, such as the compositions of tests 2, 12 and 13 were judged to be acceptable; indeed, excellent since the lowest rating of these three tests was 5.8. It appears that a very minor amount of rice—only 2% in the case of test 2—is sufficient to yield a commercially viable product in combination with heretofore unacceptably small percentages of fat.

It is also apparent that the fat content may be as low as 4% (see, for example, test 5), and a commercially viable product will result This result appears to be attributable to the substantial quantity of rice present; i e.: 25% in the composition of test 5.

From the foregoing it appears that fat and rice are to a major degree, interchangeable, though it is not known with certainty if the relationship is precisely proportional In any event, a broad range of acceptable ingredients is considered to be the following:

| | |
|---|---|
| Lean | 40%-90% |
| Fat | 4%-35% |
| Rice | 2%-35%. |

The aforesaid broad range includes several compositions which are at the low end of acceptability, such as the compositions of tests 8, 19, 22 and 23, all of which are in the 3.0-4.0 range.

Using a preferred rating of about 5.0 and above and a substantial fat reduction of approximately 10% (i.e.: about a 30% decrease from the current minimally acceptable fat content of 35% of the base mixture), it will be noted that the compositions of test numbers 4 and 11-18, at least as to pork, define a rather clearly categorized group. When the compositions of tests 2 and 5 are compared, it will be noted that a relatively small percent increase in the fat content (i.e.: from about 4% in test 5 to 18% in test 2) results in a significant increase in rating. From these facts it is considered that a preferred range has the following nominal compositions:

| Preferred | |
|---|---|
| Lean | 55-85% |
| Fat | 10-25% |
| Rice | 5-20% |

A number of samples were made up to a nominal composition of lean 70%, fat 20%, rice 10%. With respect to pork, the ratings were above 6 which, as mentioned earlier, is the equivalent to 7 on the conventional hedonic scale which is outstanding. The ratings were not as high, with respect to beef, though still acceptable.

| Most preferred | |
|---|---|
| Lean | 70% |
| Fat | 20% |
| Rice | 10%, all percentages being about ± one percent. |

A typical panel result for a pork base product is set out in the following table:

| Test No. | % Fat | % Rice | Panelist Rating | | | | | Ave. |
|---|---|---|---|---|---|---|---|---|
| | | | 0 | K | S | M | B | |
| Control | 48 | 0 | 8 | 6 | 5 | 6 | 8 | 6.6 |
| 2 | 8 | 2 | 7 | 8 | 3 | 7 | 5 | 6.0 |
| 7 | 10 | 30 | 2 | 3 | 2 | 2 | 3 | 2.4 |
| 15 | 15 | 20 | 6 | 4 | 7 | 6 | 4 | 5.4 |
| 16 | 25 | 20 | 2 | 5 | 3 | 4 | 6 | 4.0 |

The panelist rating is in points in the range of 1-8, with 8 being the highest rating.

In all of the foregoing tabulated samples the lean and fat components of the base were substantially uncooked when in initial mixture with the rice. It should also be noted that all tabulated samples except No. 18 had the same additives as were present in the control sample so that any differences attributable to differences in additives were eliminated or minimized. Further, all samples in the tabulated samples were judged on the basis of texture, flavor, and appearance as were Examples 1-8.

It will be understood that, although specific examples of the invention have been described in detail, modifications can be made within the scope of the invention. Accordingly it is intended that the scope of the invention not be limited to the foregoing disclosure, but only by the scope of the claims when interpreted in light of the relevant prior art.

We claim:

1. A method of forming a food product said method including the steps of forming a particulate mixture of lean meat, fat and rice by mixing said components to form a base mixture, grinding said meat, fat, and said rice together to form a mixture, maintaining meat particles and rice particles of said mixture at a size generally similar to one another, making sure said rice particles maintain their structural integrity, blending said mixture with spices, and without adding additional fat to said mixture, forming said mixture into a final product selected from the group including tub ®s, links, both caseless and cased, patties and bulk sausage, the particles size of the components being sufficiently small to enable the available supply of myosin to tend to form a matrix, the fat content being no more than about 35% nor less than 4%, the rice content being no more than about 35% nor less than 2%, balance lean meat in an amount no more than about 90% nor less than 40%, all in weight percent of the base mixture, whereby a generally coarse mixture of breakfast sausage is formed in which said rice particles are generally indistinguishable from fat globules, which is suitable for forming into patties and links, and which has the texture, consistency, appearance, and taste of a high-fat breakfast sausage.

2. The method of claim 1 further characterized in that salt is added until the weight of salt is between about ½% to 4% of the weight of the base mixture.

3. The method of claim 1 further characterized by and including the step of adding at least one additive to the base mixture in its substantially uncooked condition.

4. A method of forming a substitute for high-fat breakfast sausage, said method comprising:

preparing a mixture containing both lean meat and fat, preparing a quantity of pre-cooked re-hydrated rice, combining and coarse grinding said meat and said rice together to form a mixture, maintaining particles of said rice at a size generally similar to the size of meat particles in said mixture making sure said particles retain their structural integrity, blending said mixture with spices, without adding additional fat to said mixture, forming said mixture into a final product selected from the group including tubes, links, both caseless and cased, patties and bulk sausage, whereby said product is a generally coarse mixture of breakfast sausage in which said rice particles are substantially indistinguishable from fat globules, giving said product an appearance, texture and taste of high-fat content breakfast sausage.

* * * * *